United States Patent
Hong

(10) Patent No.: US 12,432,808 B2
(45) Date of Patent: Sep. 30, 2025

(54) REQUEST INFORMATION SENDING METHOD AND DEVICE, AND REQUEST INFORMATION RECEIVING METHOD AND DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 317 days.

(21) Appl. No.: 18/273,766

(22) PCT Filed: Jan. 22, 2021

(86) PCT No.: PCT/CN2021/073428
§ 371 (c)(1),
(2) Date: Jul. 22, 2023

(87) PCT Pub. No.: WO2022/155935
PCT Pub. Date: Jul. 28, 2022

(65) Prior Publication Data
US 2024/0090068 A1    Mar. 14, 2024

(51) Int. Cl.
*H04W 76/20*   (2018.01)
*H04W 88/06*   (2009.01)

(52) U.S. Cl.
CPC ......... *H04W 76/20* (2018.02); *H04W 88/06* (2013.01)

(58) Field of Classification Search
CPC ..... H04W 76/20; H04W 88/06; H04W 76/27; H04W 8/205
See application file for complete search history.

(56) References Cited

U.S. PATENT DOCUMENTS

| 2018/0160422 A1* | 6/2018 | Pathak | H04W 76/10 |
| 2021/0014934 A1* | 1/2021 | Lovlekar | H04W 4/60 |

FOREIGN PATENT DOCUMENTS

| CN | 109315017 A | 2/2019 |
| CN | 111918270 A | 11/2020 |
| CN | 112218354 A | 1/2021 |
| EP | 3344000 A1 | 7/2018 |
| WO | 2020209641 A1 | 10/2020 |

OTHER PUBLICATIONS

International Search Report of PCT/CN2021/072549 dated Sep. 26, 2021 with English translation, (4p).
Apple Inc., "Methods for Multi-SIM Network Switching", 3GPP TSG-RAN WG2 Meeting #112e, Electronic, Nov. 2020, R2-2009506, (8p).
Samsung, "Discussion on switching mechanism for multi-SIM", 3GPP TSG-RAN WG2 Meeting #112-e, R2-2010350, Online, Nov. 2020, (3p).
First Office Action of Chinese Application No. 202180000292.7 dated Aug. 31, 2022 with English translation, (13p).

* cited by examiner

*Primary Examiner* — Kathy W Wang-Hurst
(74) *Attorney, Agent, or Firm* — Arch & Lake LLP

(57) ABSTRACT

A method for sending request information, including: determining that the first SIM card is in a connected state with a first base station and the second SIM card needs to communicate, sending, to the first base station, request information for entering a non-connected state from the connected state via the first SIM card.

20 Claims, 11 Drawing Sheets

Send request information for entering a non-connected state from a connected state to a first base station through the first SIM card, in response to the first SIM card being in the connected state with the first base station, and the second SIM card needing to communicate ~ S101

FIG. 1

Send request information for entering a non-connected state from a connected state to a first base station through the first SIM card, in response to the first SIM card being in the connected state with the first base station, and the second SIM card needing to communicate ~ S101

Control the first SIM card to enter the non-connected state from the connected state ~ S201

FIG. 2

Send request information for entering a non-connected state from a connected state to a first base station through the first SIM card, in response to the first SIM card being in the connected state with the first base station, and the second SIM card needing to communicate ~ S101

Control the first SIM card to enter the non-connected state from the connected state ~ S201

Communicate with a second base station through the second SIM card ~ S301

FIG. 3

Send request information for entering a non-connected state from a connected state to a first base station through the first SIM card, in response to the first SIM card being in the connected state with the first base station, and the second SIM card needing to communicate ~ S101

Control the first SIM card to enter the non-connected state from the connected state, in response to receiving acknowledgment information sent by the first base station that the request information is received ~ S401

FIG. 4

REQUEST INFORMATION SENDING METHOD AND DEVICE, AND REQUEST INFORMATION RECEIVING METHOD AND DEVICE

CROSS-REFERENCE

The present application is a U.S. National Stage of International Application No. PCT/CN2021/073428, filed on Jan. 22, 2021, the disclosure of which is incorporated herein by reference in its entirety for all purposes.

TECHNICAL FIELD

The present disclosure relates to the field of communication technologies, and more particularly, to a method for sending request information, a method for receiving request information, a device for sending request information, a device for receiving request information, a communication device, and a computer-readable storage medium.

BACKGROUND

Multi-card terminals can be provided with a plurality of Subscriber Identity Module (SIM) cards, and the terminals can communicate through the plurality of SIM cards.

SUMMARY

Embodiments of the present disclosure propose a method for sending request information, a method for receiving request information, and a device for sending request information.

According to a first aspect of embodiments of the present disclosure, there is provided a method for sending request information, which is performed by a terminal, wherein the terminal is at least provided with a first SIM card and a second SIM card, and the method includes:
  determining that the first SIM card is in a connected state with a first base station and the second SIM card needs to communicate; and sending, to the first base station through the first SIM card, request information for entering a non-connected state from the connected state.

According to a second aspect of embodiments of the present disclosure, there is provided a method for receiving request information, which is performed by a first base station, and the method includes:
  receiving request information sent by a terminal through a first SIM card, wherein the request information is configured to request the first SIM card to enter a non-connected state from a connected state.

According to a third aspect of embodiments of the present disclosure, there is provided a device, and the device includes:
  a processor; and
  a memory configured to store processor-executable instructions;
  wherein the device is at least provided with a first SIM card and a second SIM card, and the processor is configured to determine that the first SIM card is in a connected state with a first base station and the second SIM card needs to communicate; and send, to the first base station through the first SIM card, request information for entering a non-connected state from the connected state.

BRIEF DESCRIPTION OF THE DRAWINGS

In order to more clearly illustrate technical solutions in embodiments of the present disclosure, the drawings that need to be used in the description of the embodiments will be briefly introduced below. Obviously, the drawings in the following description are only some embodiments of the present disclosure, and for those skilled in the art, other drawings can also be obtained based on these drawings without any creative effort.

FIG. 1 is a schematic flowchart showing a method for sending request information according to an embodiment of the present disclosure.

FIG. 2 is a schematic flowchart showing another method for sending request information according to an embodiment of the present disclosure.

FIG. 3 is a schematic flowchart showing yet another method for sending request information according to an embodiment of the present disclosure.

FIG. 4 is a schematic flowchart showing yet another method for sending request information according to an embodiment of the present disclosure.

DETAILED DESCRIPTION

Figure 5:
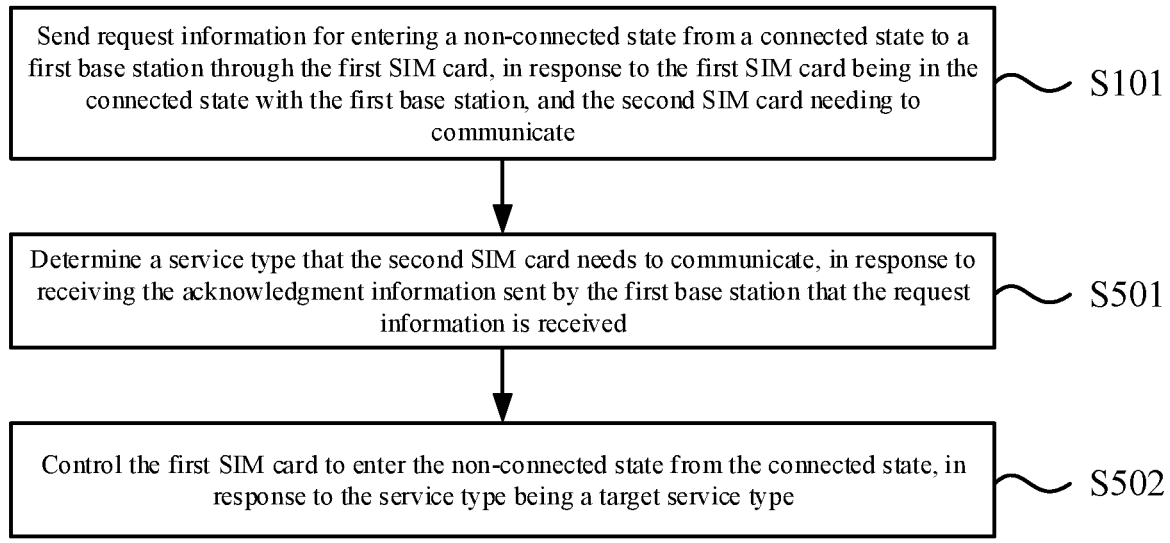
FIG. 5 is a schematic flowchart showing yet another method for sending request information according to an embodiment of the present disclosure.

The following will clearly and completely describe technical solutions in embodiments of the present disclosure in combination with the drawings in the embodiments of the present disclosure. Apparently, the described embodiments are only some of the embodiments of the present disclosure, rather than all of them. Based on the embodiments in the present disclosure, all other embodiments obtained by those skilled in the art without creative effort belong to the protection scope of the present disclosure.

Those skilled in the art can understand that the technical solutions of individual embodiments can be implemented alone or together with any other technical solution of embodiments of the present disclosure, which is not limited by the embodiments of the present disclosure.

FIG. 1 is a schematic flowchart showing a method for sending request information according to an embodiment of the present disclosure. The method for sending the request information shown in this embodiment can be performed by a terminal, and the terminal includes but is not limited to a communication device such as a mobile phone, a tablet computer, a wearable device, a sensor, and an Internet of Things device. The terminal may serve as a user equipment to communicate with a base station, and the base station includes but is not limited to a 4G base station, a 5G base station, and a 6G base station. In an embodiment, the base station may be a first base station to which a method for receiving request information described in any of the subsequent embodiments is applicable.

In an embodiment, the terminal can be provided with a plurality of SIM cards, which may be conventional SIM cards or eSIM cards, that is, embedded SIM cards. The plurality of SIM cards may belong to the same operator network, or may belong to different operator networks. The following mainly makes an illustrative description in a case where the plurality of SIM cards include at least a first SIM card and a second SIM card.

When the terminal communicates with the first base station through the first SIM card, the first SIM card is in a connected state with the first base station. In this case, if the second SIM card needs to communicate, for example, the second SIM card, by monitoring a paging signaling sent by a second base station, determines that it needs to enter a connected state with the second base station to receive and/or send service data, the first SIM card needs to exit the connected state, that is, enter a non-connected state from the connected state. However, if the first SIM card directly enters the non-connected state, the first base station does not know that the first SIM card enters the non-connected state, and will mistakenly consider that due to external reasons such as shadow fading, the first SIM card exits the connected state, and thus perform misoperations such as improving the signal power in order to communicate with the first SIM card.

As shown in FIG. 1, the method for sending the request information may include the following step:

in step S101, in response to the first SIM card being in the connected state with the first base station, and the second SIM card needing to communicate, request information for entering the non-connected state from the connected state is sent to the first base station through the first SIM card.

According to embodiments of the present disclosure, in a case where the first SIM card is in the connected state with the first base station, when the second SIM card needs to communicate, the request information can be sent to the first base station by means of the first SIM card, in order to request to enter the non-connected state from the connected state. The non-connected state may be an idle state or an inactive state.

Accordingly, the first base station can determine that the first SIM card needs to enter the non-connected state from the connected state according to the request information, so that the first base station does not mistakenly consider that due to external reasons such as shadow fading, the first SIM card exits the connected state, and thus does not perform misoperations such as improving the signal power in order to communicate with the first SIM card.

FIG. 2 is a schematic flowchart showing another method for sending request information according to an embodiment of the present disclosure. As shown in FIG. 2, in some embodiments, the method further includes:

in step S201, the first SIM card is controlled to enter the non-connected state from the connected state.

In an embodiment, after the request information is sent to the first base station through the first SIM card, the first SIM card may be controlled to enter the non-connected state from the connected state, to use the second SIM card for communication.

FIG. 3 is a schematic flowchart showing yet another method for sending request information according to an embodiment of the present disclosure. As shown in FIG. 3, in some embodiments, the method further includes:

in step S301, communication with a second base station is performed through the second SIM card.

In an embodiment, after the first SIM card is controlled to enter the non-connected state, the communication with the second base station is performed through the second SIM card. For example, the second SIM card may in the connected state with the second base station, thereby sending uplink service data to the second base station, and receiving downlink service data sent by the second base station.

FIG. 4 is a schematic flowchart showing yet another method for sending request information according to an embodiment of the present disclosure. As shown in FIG. 4, in some embodiments, the controlling the first SIM card to enter the non-connected state from the connected state includes:

in step S401, in response to receiving acknowledgment information sent by the first base station that the request information is received, the first SIM card is controlled to enter the non-connected state from the connected state.

In an embodiment, if the first base station has received the request information, it may feed back the acknowledgment information (ACK) to the terminal, and if the first base station does not receive the request information, it will not feed back the acknowledgment information to the terminal.

After receiving the acknowledgment information, the terminal can determine that the first base station has received the request information (that is, the first base station knows that the first SIM card needs to enter the non-connected state from the connected state), to control the first SIM card to enter the non-connected state from the connected state. If the terminal does not receive the acknowledgment information, it can determine that the first base station does not know that the first SIM card needs to enter the non-connected state from the connected state, so the terminal can continue to maintain the first SIM card in the connected state, avoiding the first base station mistakenly considering that due to external reasons such as shadow fading, the first SIM card exits the connected state, and thus performing misoperations such as improving the signal power in order to communicate with the first SIM card.

FIG. 5 is a schematic flowchart showing yet another method for sending request information according to an embodiment of the present disclosure. As shown in FIG. 5, in some embodiments, the controlling the first SIM card to enter the non-connected state from the connected state in response to receiving the acknowledgment information sent by the first base station that the request information is received includes:

in step S501, in response to receiving the acknowledgment information sent by the first base station that the request information is received, a service type that the second SIM card needs to communicate is determined; and in step S502, in response to the service type being a target service type, the first SIM card is controlled to enter the non-connected state from the connected state.

In an embodiment, after the acknowledgment information fed back by the first base station is received, the service type that the second SIM card needs to communicate may be further determined, and only when the service type that the second SIM card needs to communicate is the target service type, the first SIM card is controlled to enter the non-connected state from the connected state.

The target service type can be agreed in a protocol, or can be determined through negotiation between the terminal and the base station. For example, the target service type can be a relatively urgent service with a high priority, such as a voice service, an Ultra Reliable Low Latency Communication (URLLC) service.

When the service type that the second SIM card needs to communicate is not the target service type, indication information sent by the first base station may be further waited for, and it is determined whether to enter the non-connected state from the connected state according to the indication information.

Figure 6:
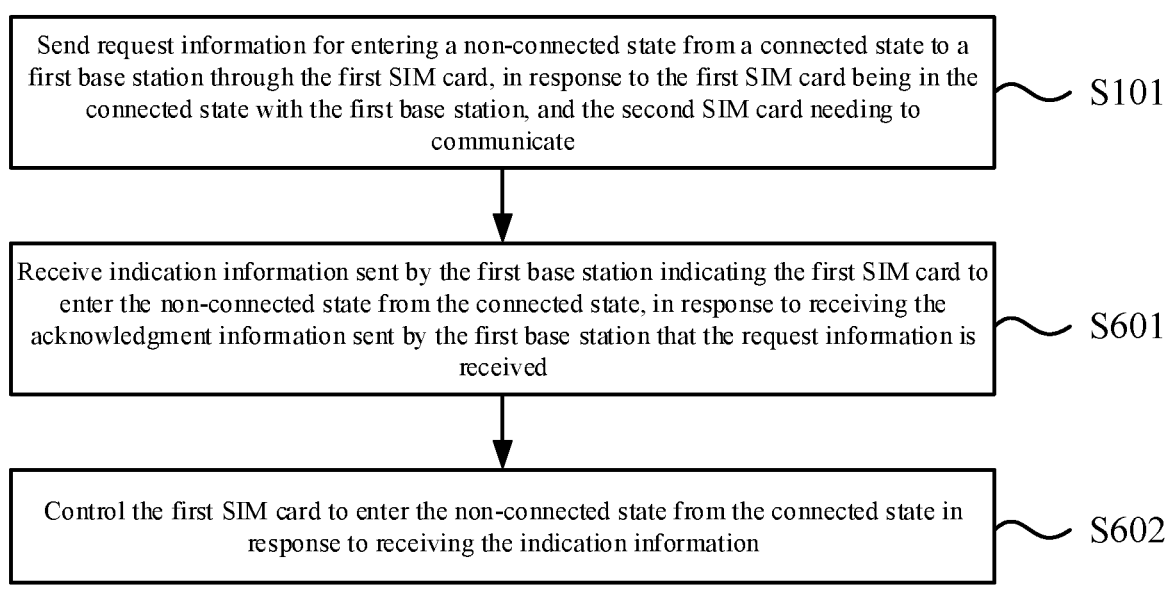
FIG. 6 is a schematic flowchart showing yet another method for sending request information according to an embodiment of the present disclosure.

FIG. 6 is a schematic flowchart showing yet another method for sending request information according to an embodiment of the present disclosure. As shown in FIG. 6, in some embodiments, the controlling the first SIM card to enter the non-connected state from the connected state in response to receiving the acknowledgment information sent by the first base station that the request information is received includes:

in step S601, in response to receiving the acknowledgment information sent by the first base station that the request information is received, indication information sent by the first base station indicating the first SIM card to enter the non-connected state from the connected state is received; and in step S602, in response to receiving the indication information, the first SIM card is controlled to enter the non-connected state from the connected state.

In an embodiment, after the acknowledgment information sent by the first base station is received, the indication information sent by the first base station indicating the first SIM card to enter the non-connected state may be further waited for. If the indication information is received, the first SIM card can be controlled to enter the non-connected state from the connected state; and if the indication information is not received, or indication information indicating the first SIM card to remain in the connected state is received, the first SIM card can be controlled to continue to be in the connected state.

The first base station may determine, as needed, to send to the first SIM card the indication information indicating the first SIM card to enter the non-connected state, or to send to the first SIM card the indication information indicating the first SIM card to remain in the connected state, or not to send the indication information.

Figure 7:
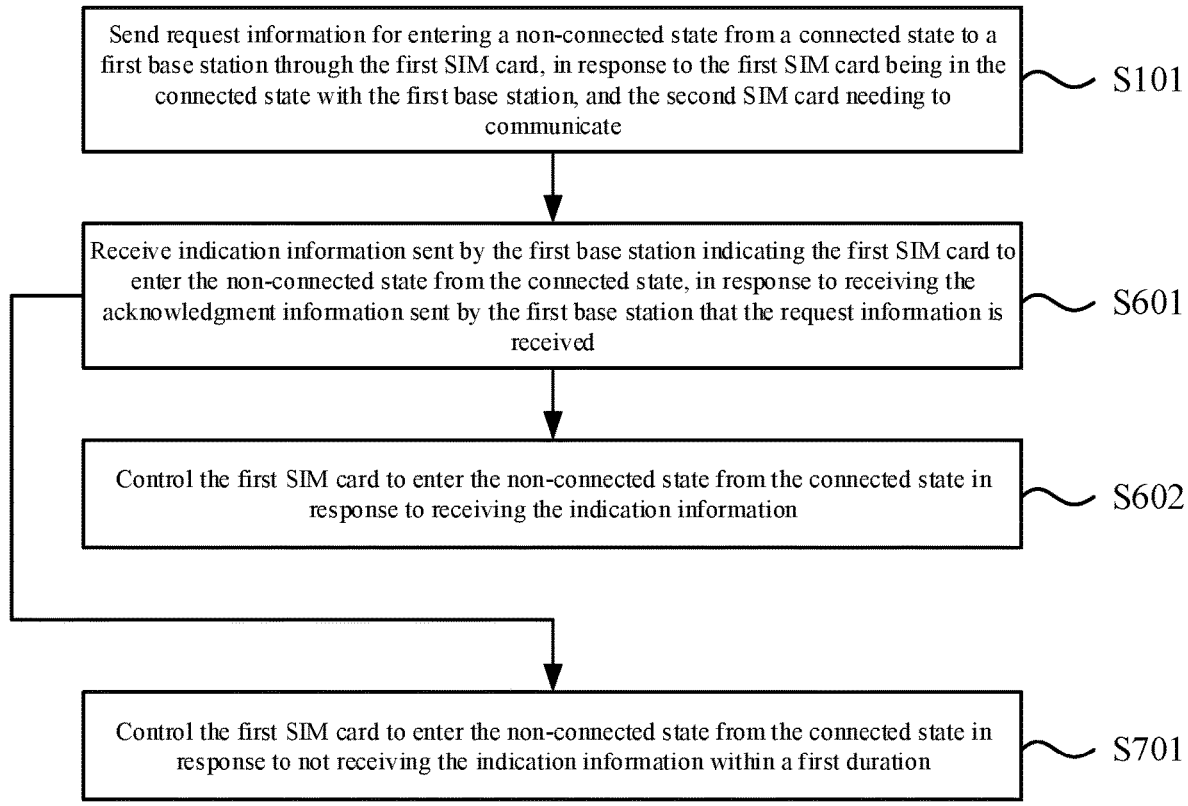
FIG. 7 is a schematic flowchart showing yet another method for sending request information according to an embodiment of the present disclosure.

FIG. 7 is a schematic flowchart showing yet another method for sending request information according to an embodiment of the present disclosure. As shown in FIG. 7, in some embodiments, the controlling the first SIM card to enter the non-connected state from the connected state further includes:

in step S701, in response to not receiving the indication information within a first duration, the first SIM card is controlled to enter the non-connected state from the connected state.

In an embodiment, after receiving the acknowledgment information, the terminal may start a timer, and a timing duration of the timer is the first duration. Before the timer expires, that is, within the first duration, if the indication information fed back by the first base station is not received, the first SIM card may be controlled to enter the non-connected state from the connected state, to use the second SIM card for communication, and avoid causing a large delay to the communication of the second SIM card. Before the timer expires, that is, within the first duration, if the indication information fed back by the first base station is received, whether to control the first SIM card to enter the non-connected state from the connected state can be determined according to the indication information.

Figure 8:
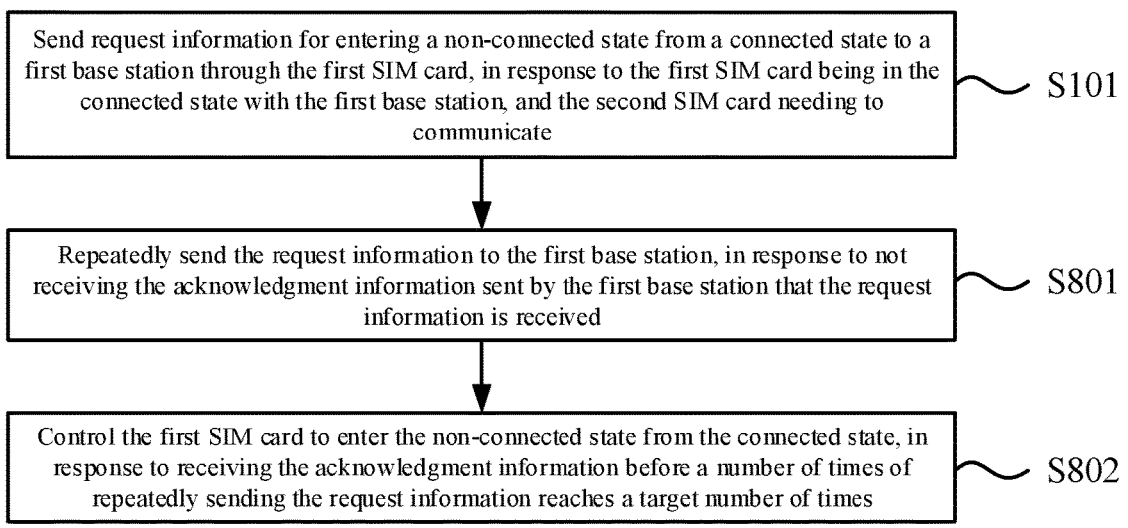
FIG. 8 is a schematic flowchart showing yet another method for sending request information according to an embodiment of the present disclosure.

FIG. 8 is a schematic flowchart showing yet another method for sending request information according to an embodiment of the present disclosure. As shown in FIG. 8, in some embodiments, the controlling the first SIM card to enter the non-connected state from the connected state includes:

in step S801, in response to not receiving the acknowledgment information sent by the first base station that the request information is received, the request information is repeatedly sent to the first base station; and in step S802, in response to receiving the acknowledgment information before a number of times of repeatedly sending the request information reaches a target number of times, the first SIM card is controlled to enter the non-connected state from the connected state.

In an embodiment, if the acknowledgment information fed back by the first base station is not received, it may be because the communication quality between the first SIM card and the first base station is poor, and the first base station fails to accurately receive the request information, then the request information may be repeatedly sent to the first base station through the first SIM card, to ensure that the first base station can receive the request information, and then feed back the acknowledgment information. If the acknowledgment information fed back by the first base station is received before the number of times of repeatedly sending the request information reaches the target number of times, the first SIM card may be controlled to enter the non-connected state from the connected state.

Figure 9:
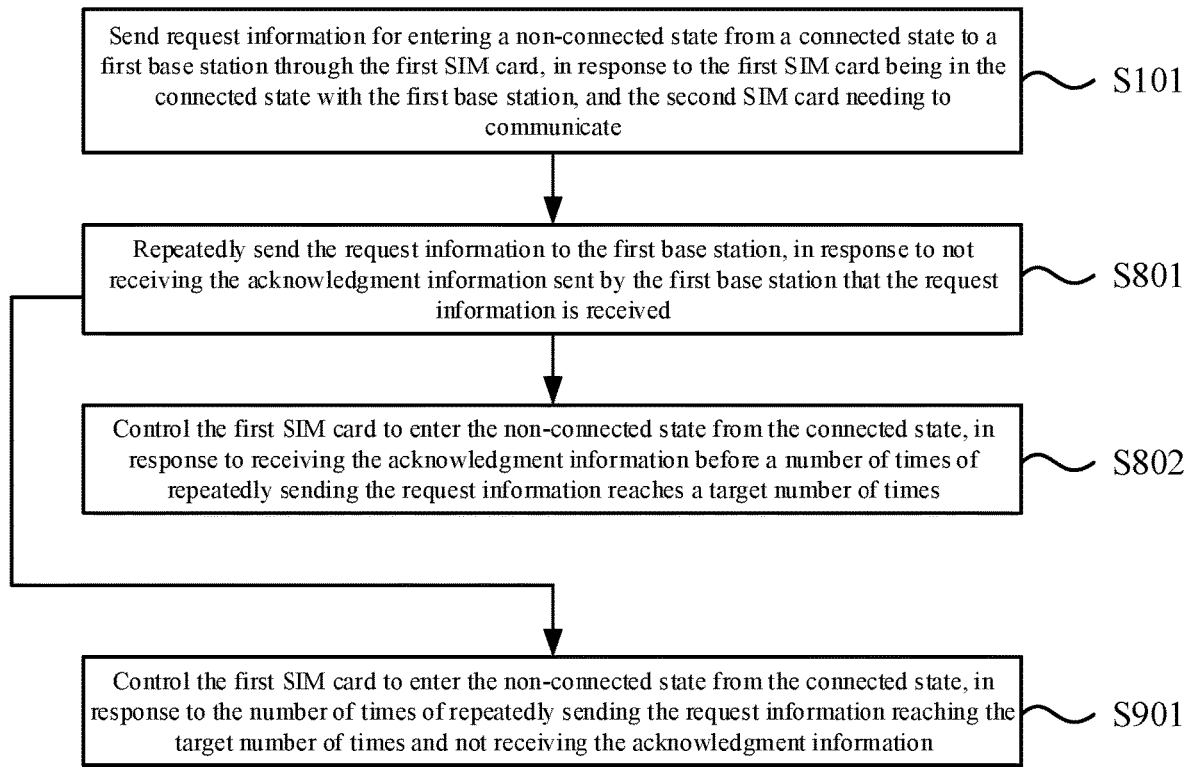
FIG. 9 is a schematic flowchart showing yet another method for sending request information according to an embodiment of the present disclosure.

FIG. 9 is a schematic flowchart showing yet another method for sending request information according to an embodiment of the present disclosure. As shown in FIG. 9, in some embodiments, the controlling the first SIM card to enter the non-connected state from the connected state further includes:

in step S901, in response to the number of times of repeatedly sending the request information reaching the target number of times and not receiving the acknowledgment information, the first SIM card is controlled to enter the non-connected state from the connected state.

In an embodiment, if the number of times of repeatedly sending the request information reaches the target number of times but the acknowledgment information fed back by the first base station has not yet been received, the first SIM card may also be controlled to enter the non-connected state from the connected state, to use the second SIM card for communication, and avoid causing a large delay to the communication of the second SIM card.

It should be noted that, in this case, the terminal may also determine whether to control the first SIM card to enter the non-connected state from the connected state according to its own implementation.

For example, if the protocol predetermines to control the first SIM card to enter the non-connected state from the connected state in this case, the first SIM card is controlled to enter the non-connected state from the connected state, and if the protocol predetermines to maintain the first SIM card in the connected state in this case, the first SIM card is maintained in the connected state.

For example, the terminal determines a first service type that the first SIM card communicates and a second service type that the second SIM card communicates, and then compares priorities of these two service types. If the priority of the first service type is higher, the first SIM card is maintained in the connected state, and if the priority of the second service type is higher, the first SIM card is controlled to enter the non-connected state from the connected state.

Figure 10:
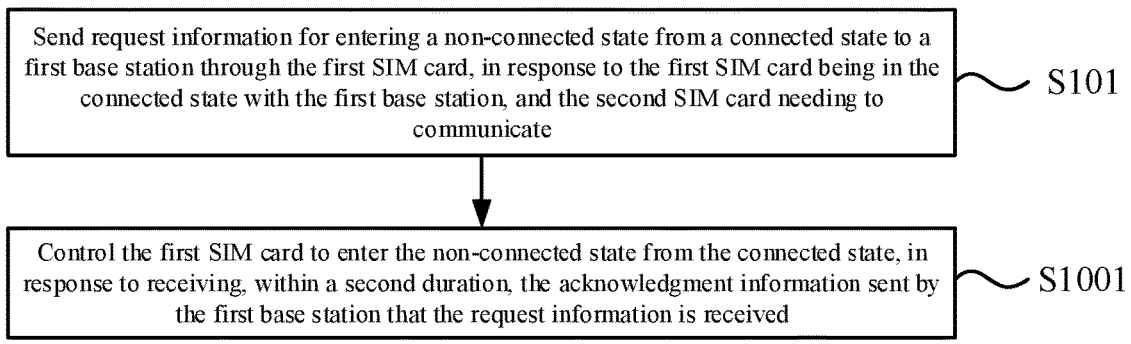
FIG. 10 is a schematic flowchart showing yet another method for sending request information according to an embodiment of the present disclosure.

FIG. 10 is a schematic flowchart showing yet another method for sending request information according to an embodiment of the present disclosure. As shown in FIG. 10, in some embodiments, the controlling the first SIM card to enter the non-connected state from the connected state includes:

in step S1001, in response to receiving, within a second duration, the acknowledgment information sent by the first base station that the request information is received, the first SIM card is controlled to enter the non-connected state from the connected state.

In an embodiment, after sending the request information to the first base station through the first SIM card, the terminal can start the timer, and the timing duration of the timer is the second duration. Before the timer expires, that is, within the second duration, if the acknowledgment information fed back by the first base station is received, the first SIM card may be controlled to enter the non-connected state from the connected state.

Figure 11:
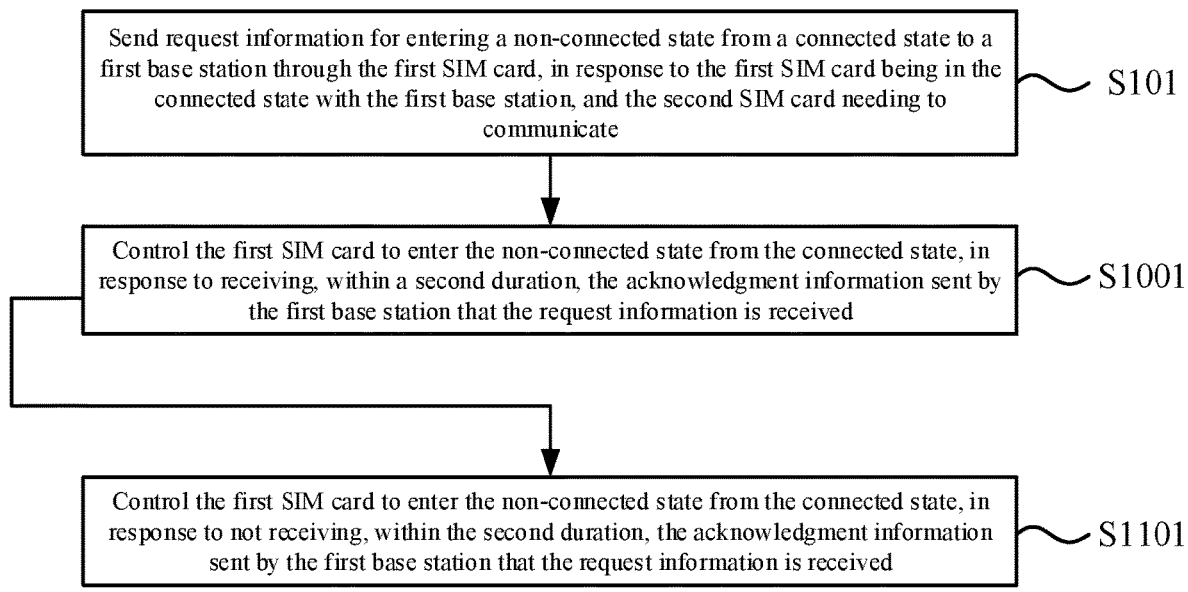
FIG. 11 is a schematic flowchart showing yet another method for sending request information according to an embodiment of the present disclosure.

FIG. 11 is a schematic flowchart showing yet another method for sending request information according to an embodiment of the present disclosure. As shown in FIG. 11, in some embodiments, the controlling the first SIM card to enter the non-connected state from the connected state further includes:

in step S1101, in response to not receiving, within the second duration, the acknowledgment information sent by the first base station that the request information is received, the first SIM card is controlled to enter the non-connected state from the connected state.

In an embodiment, after sending the request information to the first base station through the first SIM card, the terminal can start the timer, and the timing duration of the timer is the second duration. Before the timer expires, that is, within the second duration, if the acknowledgment information fed back by the first base station is not received, the first SIM card can be controlled to enter the non-connected state from the connected state, to use the second SIM card for communication, and avoid causing a large delay to the communication of the second SIM card.

It should be noted that, in this case, the terminal may also determine whether to control the first SIM card to enter the non-connected state from the connected state according to its own implementation.

For example, if the protocol predetermines to control the first SIM card to enter the non-connected state from the connected state in this case, the first SIM card is controlled to enter the non-connected state from the connected state, and if the protocol predetermines to maintain the first SIM card in the connected state in this case, the first SIM card is maintained in the connected state.

For example, the terminal determines a first service type that the first SIM card communicates and a second service type that the second SIM card communicates, and then compares priorities of these two service types. If the priority of the first service type is higher, the first SIM card is maintained in the connected state, and if the priority of the second service type is higher, the first SIM card is controlled to enter the non-connected state from the connected state.

In an embodiment, the request information carries auxiliary information, and the auxiliary information includes at least one of type information of the first SIM card entering the non-connected state from the connected state;
configuration information of the first SIM card entering the non-connected state from the connected state; or
information of a timer of the first SIM card entering the non-connected state from the connected state.

In an embodiment, the request information sent by the first SIM card to the first base station may carry the auxiliary information, and the first base station can be notified of some specific information of the first SIM card entering the non-connected state through the auxiliary information.

In an embodiment, the first base station may be notified of the type information of the first SIM card entering the non-connected state. If the non-connected state that the terminal controls the first SIM card to enter is the idle state, then the type information is the idle state, and if the non-connected state that the terminal controls the first SIM card to enter is the inactive state, then the type information is the inactive state. Since the subsequent communication process between the first base station and the first SIM card may be different in different non-connected states, the type information is notified to the first base station to facilitate the subsequent communication between the first base station and the first SIM card.

In an embodiment, the first base station may be notified of the configuration information of the first SIM card entering the non-connected state, for example, a moment when the first SIM card enters the non-connected state, a duration of the non-connected state, and how often the non-connected state is entered.

In an embodiment, the first base station may be notified of the information of the timer of the first SIM card entering the non-connected state, for example, information such as a start time of the timer and a timing duration of the timer. When the timer expires, the first SIM card enters the non-connected state.

Figure 12:
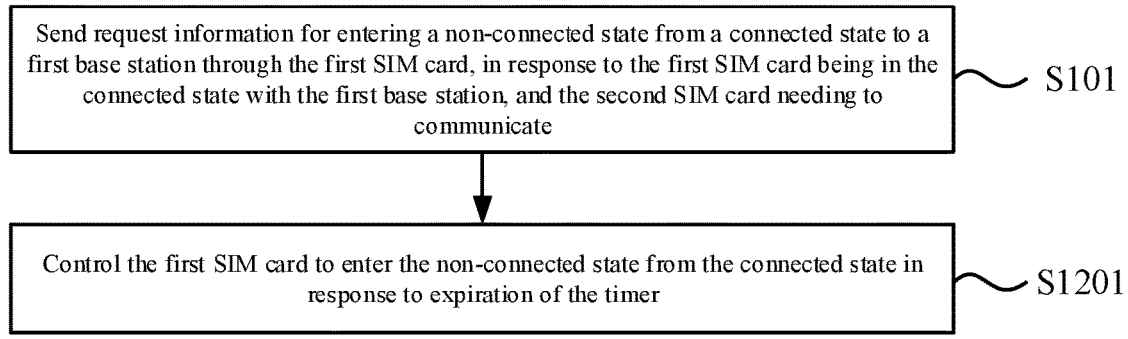
FIG. 12 is a schematic flowchart showing yet another method for sending request information according to an embodiment of the present disclosure.

FIG. 12 is a schematic flowchart showing yet another method for sending request information according to an embodiment of the present disclosure. As shown in FIG. 12, in some embodiments, the timer is started when the request information is sent or when the acknowledgment information for the request information sent by the first base station, which the request information is received by the first base station, is received or when the indication information sent by the first base station indicating the first SIM card to enter the non-connected state is received, and the controlling the first SIM card to enter the non-connected state from the connected state includes:

in step S1201, the first SIM card is controlled to enter the non-connected state from the connected state in response to expiration of the timer.

In an embodiment, the terminal can start the timer when sending the request information, and then control the first SIM card to enter the non-connected state when the timer expires. The terminal can start the timer when receiving the acknowledgment information, and then control the first SIM card to enter the non-connected state when the timer expires. The terminal can start the timer when receiving the indication information, and then control the first SIM card to enter the non-connected state when the timer expires.

Figure 13:
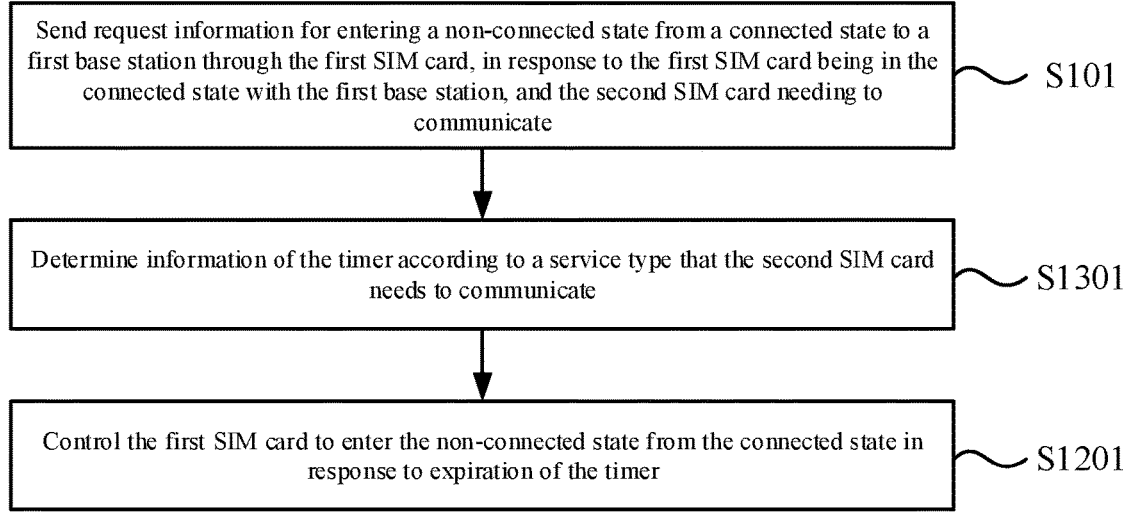
FIG. 13 is a schematic flowchart showing yet another method for sending request information according to an embodiment of the present disclosure.

FIG. 13 is a schematic flowchart showing yet another method for sending request information according to an embodiment of the present disclosure. As shown in FIG. 13, in some embodiments, the auxiliary information includes information of the timer, and the method further includes:

in step S1301, the information of the timer is determined according to the service type that the second SIM card needs to communicate.

In an embodiment, the service type that the second SIM card needs to communicate can be determined, and then the information of the timer is determined according to the service type. Accordingly, for the second SIM card needing to perform different service types of communication, the information of the timer can vary.

For example, a priority of the service type that the second SIM card communicates is relatively high (for example, higher than a priority of the service type that the first SIM card communicates), then the timing duration of the timer can be relatively short, to control the first SIM card to enter the non-connected state as soon as possible, to use the second SIM card for communication, and reduce the communication delay of the second SIM card. For example, the priority of the service type that the second SIM card communicates is relatively low priority (for example, lower than the priority of the service type that the first SIM card communicates), then the timing duration of the timer can be relatively long, to maintain the first SIM card in the connected state for communication as much as possible.

Further, when the information of the timer is determined, the service type that the first SIM card is communicating may also be considered.

In an embodiment, the request information carries reason information for the first SIM card requesting to enter the non-connected state from the connected state.

The reason information includes at least one of:
a service type that the second SIM card needs to communicate;
existing an emergency service on the other SIM card; or
one or more of preset reasons.

In an embodiment, the request information sent by the first SIM card to the first base station may carry the reason information, and the first base station may be notified of some specific reasons for the first SIM card entering the non-connected state through the reason information, so that the base station clarifies why the first SIM card enters the non-connected state.

The reason information may be a specific service type that the second SIM card needs to communicate. The second SIM card may send to the first SIM card the service type that needs to be communicated, for example, through an interface between SIM cards. Alternatively, the second SIM card may first send to a processor of the terminal the service type that needs to be communicated, and then the service type is sent to the first SIM card by the processor.

In an embodiment, the reason information may not contain a specific service type, to avoid potential safety hazards (especially when the first SIM card and the second SIM card do not belong to the same operator). For example, the first base station can be roughly notified of the reason for the first SIM card exiting the connected state being the other SIM card (that is, the second SIM card other than the first SIM card) has an emergency service. Alternatively, the reason can be preset, and then when the first SIM card enters the disconnected state, one or more reasons is selected from the preset reasons to notify the first base station.

It should be noted that, in addition to the reason information being carried in the request information, the reason information can also be sent through other information, such as user equipment assistance information (UEAssistanceInformation). Specifically, the reason information can be carried in the existing user equipment assistance information, or the user equipment assistance information is newly created to send the reason information.

Figure 14:
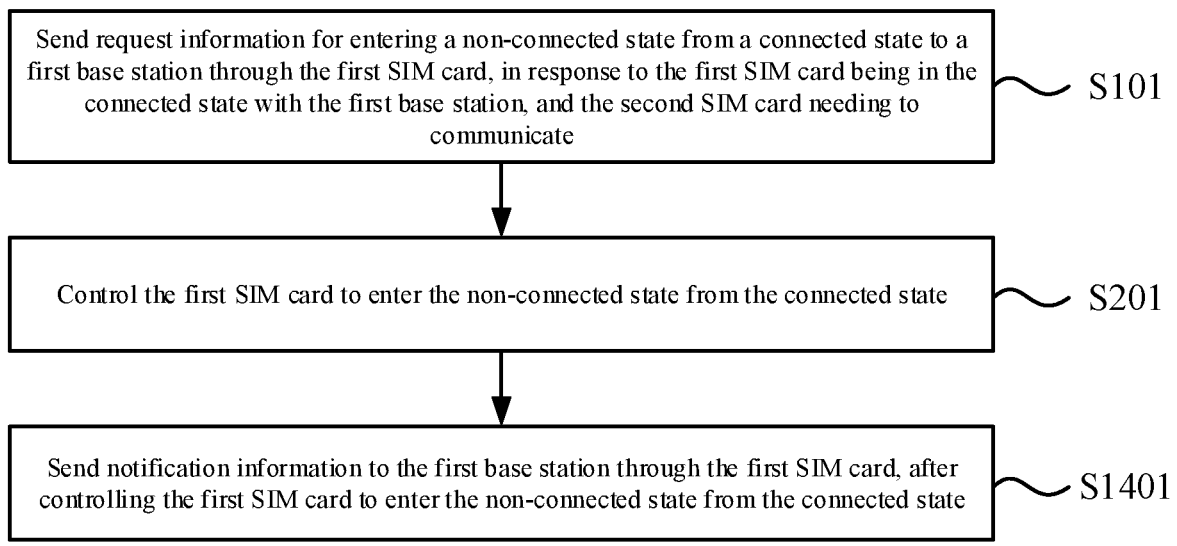
FIG. 14 is a schematic flowchart showing yet another method for sending request information according to an embodiment of the present disclosure.

FIG. 14 is a schematic flowchart showing yet another method for sending request information according to an embodiment of the present disclosure. As shown in FIG. 14, in some embodiments, the method further includes:

in step S1401, after the first SIM card is controlled to enter the non-connected state from the connected state, notification information is sent to the first base station through the first SIM card, and the notification information is configured to notify the first base station of at least one of:

a reason for the first SIM card being controlled to enter the non-connected state from the connected state, or a time for the first SIM card being controlled to enter the non-connected state from the connected state.

In an embodiment, after the first SIM card is controlled to enter the non-connected state from the connected state, the notification information may be sent to the first base station, and the first base station may be notified of information, such as the reason for the first SIM card entering the non-connected state and the time for the first SIM card entering the non-connected state, through the notification information.

The notification information may be sent to the first base station through being carried by physical layer information, or may be sent to the first base station through being carried by a Media Access Control Control Element (MAC CE), or may be sent to the first base station through being carried by a radio resource control signaling, which may be specifically selected according to needs.

Figure 15:
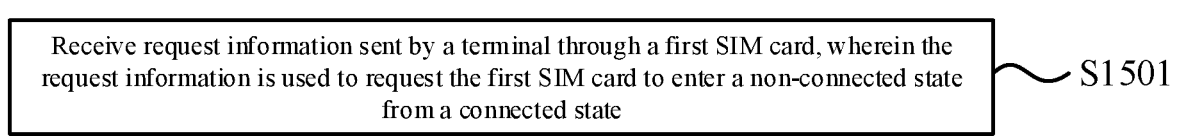
FIG. 15 is a schematic flowchart showing a method for receiving request information according to an embodiment of the present disclosure.

FIG. 15 is a schematic flowchart showing a method for receiving request information according to an embodiment of the present disclosure. The method for receiving the request information shown in this embodiment can be performed by a first base station, and the first base station includes but is not limited to a 4G base station, a 5G base station, and a 6G base station. The first base station may communicate with a terminal serving as the user equipment, and the terminal includes but is not limited to a communication device such as a mobile phone, a tablet computer, a wearable device, a sensor, and an Internet of Things device. In an embodiment, the terminal may be a terminal to which the method for sending the request information described in any of the foregoing embodiments is applicable.

In an embodiment, the terminal can be provided with a plurality of SIM cards, which may be conventional SIM cards or eSIM cards, that is, embedded SIM cards. The plurality of SIM cards may belong to the same operator network, or may belong to different operator networks. The following mainly makes an illustrative description in a case where the plurality of SIM cards include at least a first SIM card and a second SIM card.

As shown in FIG. 15, the method for receiving the request information may include the following step:

in step S1501, the request information sent by the terminal through the first SIM card is received, and the request information is configured to request the first SIM card to enter a non-connected state from a connected state.

According to embodiments of the present disclosure, in a case where the first SIM card is in the connected state with the first base station, when the second SIM card needs to communicate, the request information can be sent to the first base station by means of the first SIM card, in order to request to enter the non-connected state from the connected state. The non-connected state may be an idle state or an inactive state.

Accordingly, the first base station can determine that the first SIM card needs to enter the non-connected state from the connected state according to the request information, so that the first base station does not mistakenly consider that due to external reasons such as shadow fading, the first SIM card exits the connected state, and thus does not perform misoperations such as improving the signal power in order to communicate with the first SIM card.

Figure 16:
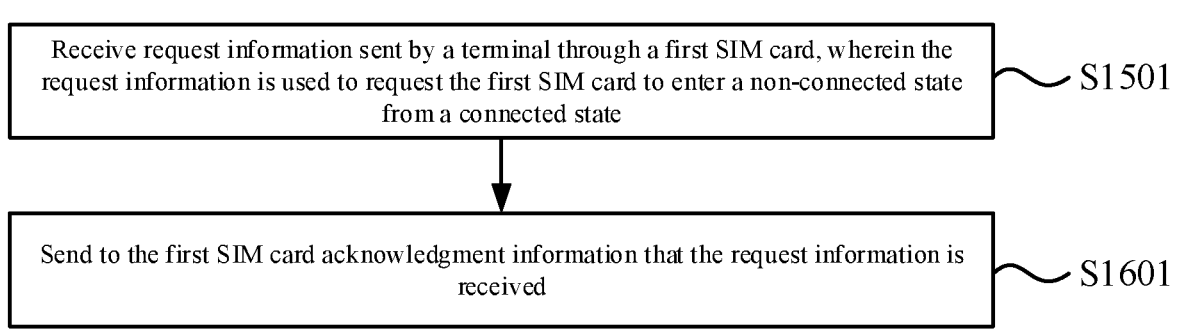
FIG. 16 is a schematic flowchart showing another method for receiving request information according to an embodiment of the present disclosure.

FIG. 16 is a schematic flowchart showing another method for receiving request information according to an embodiment of the present disclosure. As shown in FIG. 16, in some embodiments, the method further includes:

in step S1601, acknowledgment information that the request information is received is sent to the first SIM card.

In an embodiment, after receiving the request information, the first base station may feed back the acknowledgment information to the terminal, and if the first base station does not receive the request information, it may not feed back the acknowledgment information to the terminal. By feeding back the acknowledgment information to the terminal, the terminal is enabled to determine that the first base station has received the request information (that is, the first base station knows that the first SIM card needs to enter the non-connected state from the connected state), and then control the first SIM card to enter the non-connected state from the connected state.

Figure 17:
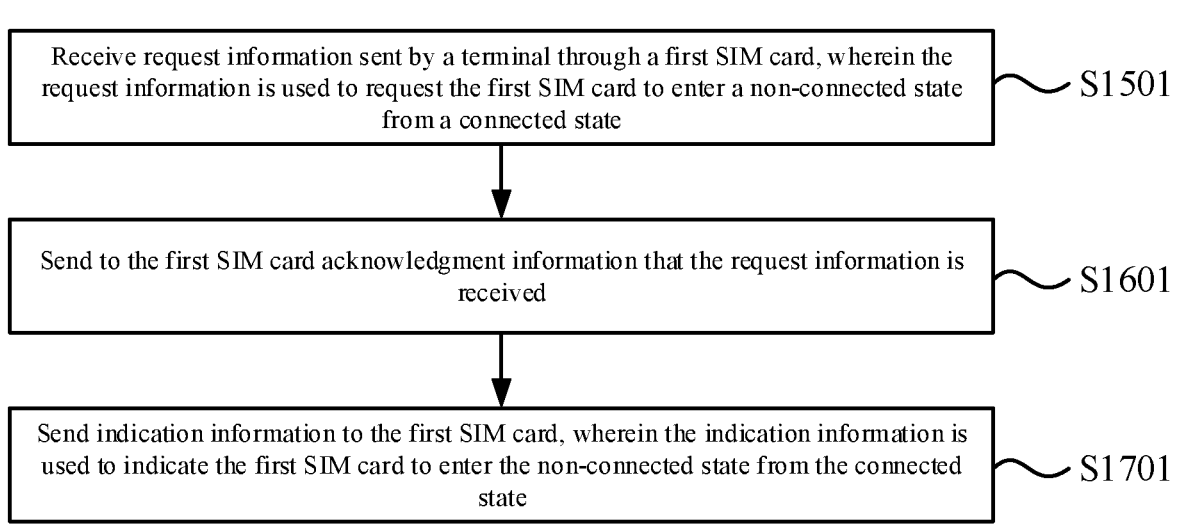
FIG. 17 is a schematic flowchart showing yet another method for receiving request information according to an embodiment of the present disclosure.

FIG. 17 is a schematic flowchart showing yet another method for receiving request information according to an embodiment of the present disclosure. As shown in FIG. 17, in some embodiments, the method further includes:

in step S1701, indication information is sent to the first SIM card, and the indication information is configured to indicate the first SIM card to enter the non-connected state from the connected state.

In an embodiment, after feeding back the acknowledgment information to the terminal, the first base station may also generate the indication information to feed back to the terminal, to indicate the first SIM card to enter the non-connected state from the connected state through the indication information.

The first base station may determine, as needed, to send to the first SIM card the indication information indicating the first SIM card to enter the non-connected state, or to send to the first SIM card the indication information indicating the first SIM card to remain in the connected state, or not to send the indication information.

Figure 18:
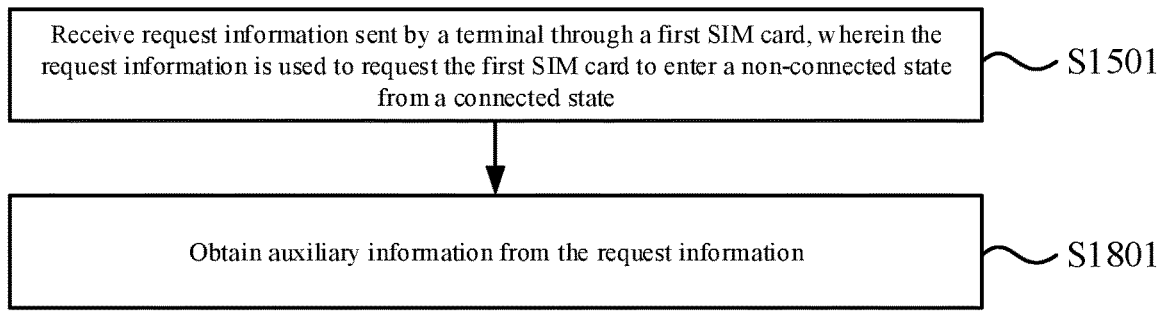
FIG. 18 is a schematic flowchart showing yet another method for receiving request information according to an embodiment of the present disclosure.

FIG. 18 is a schematic flowchart showing yet another method for receiving request information according to an embodiment of the present disclosure. As shown in FIG. 18, in some embodiments, the method further includes:

in step S1801, auxiliary information is obtained from the request information, and at least one of the following is determined according to the auxiliary information:

type information of the first SIM card entering the non-connected state from the connected state;

configuration information of the first SIM card entering the non-connected state from the connected state; or information of a timer of the first SIM card entering the non-connected state from the connected state.

In an embodiment, the request information sent by the first SIM card to the first base station may carry the auxiliary information, and the first base station may determine some specific information of the first SIM card entering the non-connected state according to the auxiliary information.

In an embodiment, the auxiliary information may include the type information of the first SIM card entering the non-connected state. If the non-connected state that the terminal controls the first SIM card to enter is the idle state, then the type information is the idle state, and if the non-connected state that the terminal controls the first SIM card to enter is the inactive state, then the type information is the inactive state. Since the subsequent communication process between the first base station and the first SIM card may be different in different non-connected states, the type information is notified to the first base station to facilitate the subsequent communication between the first base station and the first SIM card.

In an embodiment, the auxiliary information may include the configuration information of the first SIM card entering the non-connected state, for example, a moment when the first SIM card enters the non-connected state, a duration of the non-connected state, and how often the non-connected state is entered.

In an embodiment, the auxiliary information may include the information of the timer of the first SIM card entering the non-connected state, for example, information such as a start time of the timer and a timing duration of the timer. When the timer expires, the first SIM card enters the non-connected state.

In some embodiments, the timer is started when the request information is sent or when the acknowledgment information for the request information sent by the first base station, which the request information is received by the first base station, is received or when the indication information sent by the first base station indicating the first SIM card to enter the non-connected state is received.

In an embodiment, the information of the timer may include the start time of the timer, for example, the timer is started when the request information is sent, the timer is started when the acknowledgment information is received, the timer is started when the indication information is received, and so on.

Figure 19:
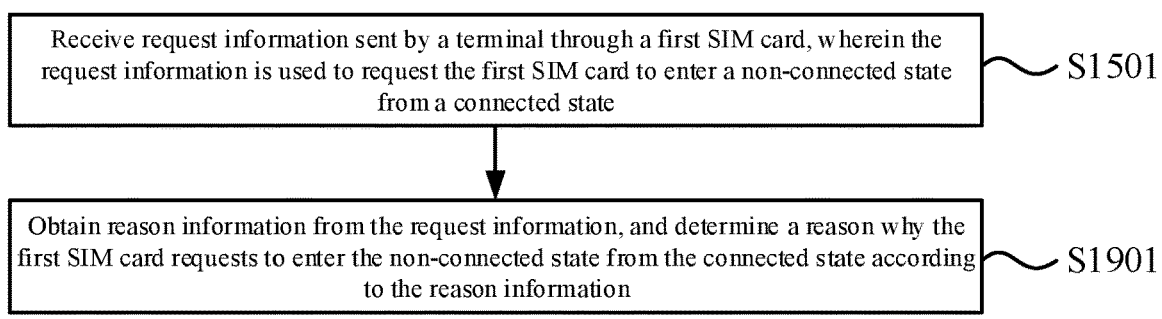
FIG. 19 is a schematic flowchart showing yet another method for receiving request information according to an embodiment of the present disclosure.

FIG. 19 is a schematic flowchart showing yet another method for receiving request information according to an embodiment of the present disclosure. As shown in FIG. 19, in some embodiments, the method further includes:

in step S1901, reason information is obtained from the request information, and a reason for the first SIM card requesting to enter the non-connected state from the connected state is determined according to the reason information.

In an embodiment, the request information sent by the first SIM card to the first base station may carry the reason information, and the first base station may determine some specific reasons for the first SIM card entering the non-connected state according to the reason information, so that the base station clarifies why the first SIM card enters the non-connected state.

In some embodiments, the reason information includes at least one of:

a service type that the second SIM card needs to communicate;
existing an emergency service on the other SIM card; or
one or more of preset reasons.

In an embodiment, the reason information may be a specific service type that the second SIM card needs to communicate. The second SIM card may send to the first SIM card the service type that needs to be communicated, for example, through an interface between SIM cards. Alternatively, the second SIM card may first send to a processor of the terminal the service type that needs to be communicated, and then the service type is sent to the first SIM card by the processor.

In an embodiment, the reason information may not contain a specific service type, to avoid potential safety hazards (especially when the first SIM card and the second SIM card do not belong to the same operator). For example, the first base station can be roughly notified of the reason for the first SIM card exiting the connected state being the other SIM card (that is, the second SIM card other than the first SIM card) has an emergency service. Alternatively, the reason can be preset, and then when the first SIM card enters the disconnected state, one or more reasons is selected from the preset reasons to notify the first base station.

Figure 20:
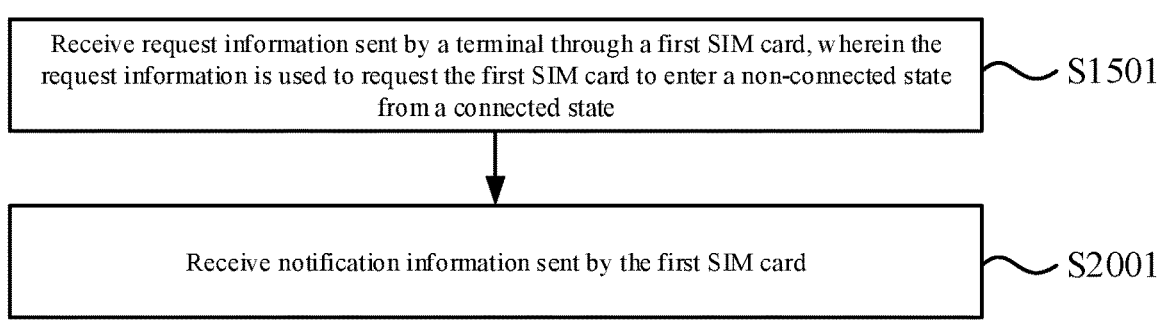
FIG. 20 is a schematic flowchart showing yet another method for receiving request information according to an embodiment of the present disclosure.

FIG. 20 is a schematic flowchart showing yet another method for receiving request information according to an embodiment of the present disclosure. As shown in FIG. 20, in some embodiments, the method further includes:

in step S2001, notification information sent by the first SIM card is received, and the notification information is configured to notify the first base station of at least one of:

a reason for the first SIM card being controlled to enter the non-connected state from the connected state, or a time for the first SIM card being controlled to enter the non-connected state from the connected state.

In an embodiment, after the first SIM card enters the non-connected state from the connected state, the base station may receive the notification information sent by the first SIM card, and may determine the information, such as the reason for the first SIM card entering the non-connected state and the time for the first SIM card entering the non-connected state, according to the notification information.

The notification information may be sent to the first base station through being carried by physical layer information, or may be sent to the first base station through being carried by a Media Access Control Control Element (MAC CE), or may be sent to the first base station through being carried by a radio resource control signaling, which may be specifically selected according to needs.

Corresponding to the forgoing embodiments of the method for sending the request information and the method for receiving the request information, the present disclosure also provides embodiments of a device for sending request information and a device for receiving request information.

Figure 21:
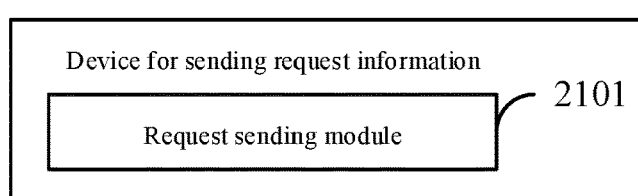
FIG. 21 is a schematic block diagram showing a device for sending request information according to an embodiment of the present disclosure.

FIG. 21 is a schematic block diagram showing a device for sending request information according to an embodiment of the present disclosure. The device for sending the request information shown in this embodiment can be performed by a terminal, and the terminal includes but is not limited to a communication device such as a mobile phone, a tablet computer, a wearable device, a sensor, and an Internet of Things device. The terminal may serve as a user equipment to communicate with a base station, and the base station includes but is not limited to a 4G base station, a 5G base station, and a 6G base station. In an embodiment, the base station may be a first base station to which a device for receiving request information described in any of the subsequent embodiments is applicable.

In an embodiment, the terminal can be provided with a plurality of SIM cards, which may be conventional SIM cards or eSIM cards, that is, embedded SIM cards. The plurality of SIM cards may belong to the same operator network, or may belong to different operator networks. The following mainly makes an illustrative description in a case where the plurality of SIM cards include at least a first SIM card and a second SIM card.

As shown in FIG. 21, the device for sending the request information may include:

a request sending module 2101, configured to send request information for entering a non-connected state from a connected state to a first base station through the first SIM card, in response to the first SIM card being in the connected state with the first base station, and the second SIM card needing to communicate.

Figure 22:
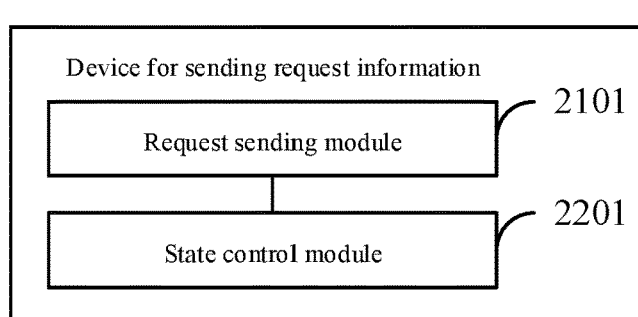
FIG. 22 is a schematic block diagram showing another device for sending request information according to an embodiment of the present disclosure.

FIG. 22 is a schematic block diagram showing another device for sending request information according to an embodiment of the present disclosure. As shown in FIG. 22, in some embodiments, the device further includes:

a state control module 2201, configured to control the first SIM card to enter the non-connected state from the connected state.

Figure 23:
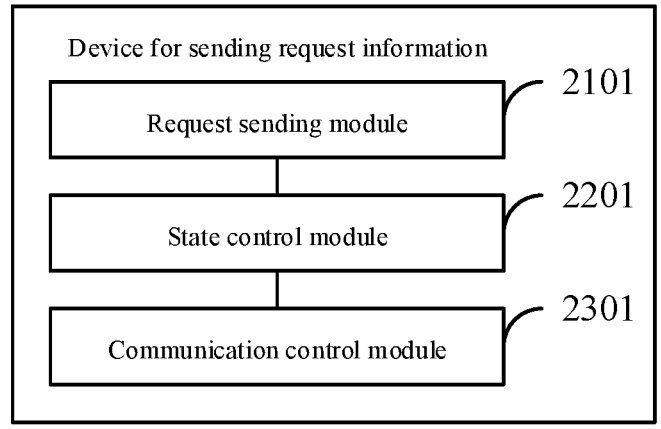
FIG. 23 is a schematic block diagram showing yet another device for sending request information according to an embodiment of the present disclosure.

FIG. 23 is a schematic block diagram showing yet another device for sending request information according to an embodiment of the present disclosure. As shown in FIG. 23, in some embodiments, the device further includes:

a communication control module 2301, configured to communicate with a second base station through the second SIM card.

In some embodiments, the state control module is configured to control the first SIM card to enter the non-connected state from the connected state, in response to receiving acknowledgment information sent by the first base station that the request information is received.

In some embodiments, the state control module is configured to determine a service type that the second SIM card needs to communicate, in response to receiving the acknowledgment information sent by the first base station that the request information is received; and control the first SIM card to enter the non-connected state from the connected state in response to the service type being a target service type.

In some embodiments, the state control module is configured to receive indication information sent by the first base station indicating the first SIM card to enter the non-connected state from the connected state, in response to receiving the acknowledgment information sent by the first base station that the request information is received; and control the first SIM card to enter the non-connected state from the connected state in response to receiving the indication information.

In some embodiments, the state control module is configured to control the first SIM card to enter the non-connected state from the connected state in response to not receiving the indication information within a first duration.

In some embodiments, the state control module is configured to repeatedly send the request information to the first base station in response to not receiving the acknowledgment information sent by the first base station that the request information is received; and control the first SIM card to enter the non-connected state from the connected state in response to receiving the acknowledgment information before a number of times of repeatedly sending the request information reaches a target number of times.

In some embodiments, the state control module is further configured to control the first SIM card to enter the non-connected state from the connected state in response to the number of times of repeatedly sending the request information reaching the target number of times and not receiving the acknowledgment information.

In some embodiments, the state control module is configured to control the first SIM card to enter the non-connected state from the connected state in response to receiving, within a second duration, the acknowledgment information sent by the first base station that the request information is received.

In some embodiments, the state control module is further configured to control the first The SIM card to enter the non-connected state from the connected state in response to not receiving, within the second duration, the acknowledgment information sent by the first base station that the request information is received.

In some embodiments, the request information carries auxiliary information, and the auxiliary information includes at least one of:

type information of the first SIM card entering the non-connected state from the connected state;

configuration information of the first SIM card entering the non-connected state from the connected state; or information of a timer of the first SIM card entering the non-connected state from the connected state.

In some embodiments, the timer is started when the request information is sent or when the acknowledgment information for the request information sent by the first base station, which the request information is received by the first base station, is received or when the indication information sent by the first base station indicating the first SIM card to enter the non-connected state is received, the state control module is configured to control the first SIM card to enter the non-connected state from the connected state in response to expiration of the timer.

Figure 24:
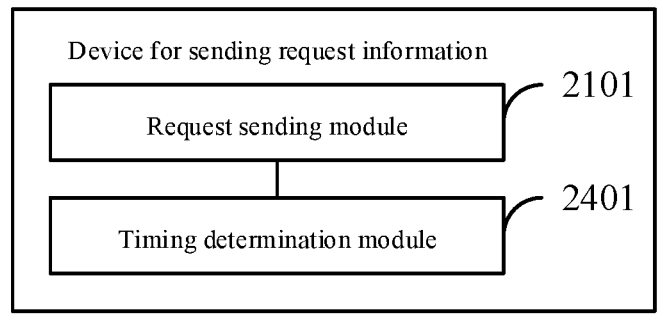
FIG. 24 is a schematic block diagram showing yet another device for sending request information according to an embodiment of the present disclosure.

FIG. 24 is a schematic block diagram showing yet another device for sending request information according to an embodiment of the present disclosure. As shown in FIG. 24, in some embodiments, the auxiliary information includes the information of the timer, and the device further includes:

a timing determination module 2401, configured to determine the information of the timer according to a service type that the second SIM card needs to communicate.

In some embodiments, the request information carries reason information for the first SIM card requesting to enter the non-connected state from the connected state.

In some embodiments, the reason information includes at least one of:

a service type that the second SIM card needs to communicate;

existing an emergency service on the other SIM card; or one or more of preset reasons.

Figure 25:
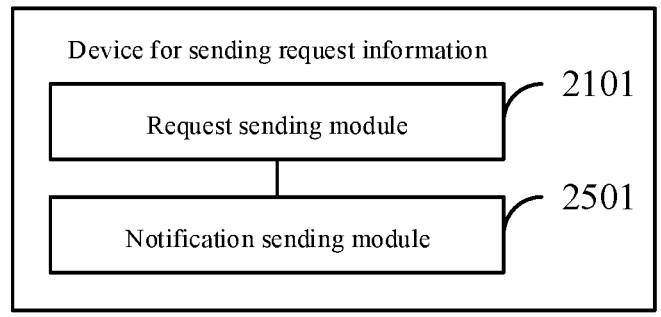
FIG. 25 is a schematic block diagram showing yet another device for sending request information according to an embodiment of the present disclosure.

FIG. 25 is a schematic block diagram showing yet another device for sending request information according to an embodiment of the present disclosure. As shown in FIG. 25, in some embodiments, the device further includes:

a notification sending module 2501, configured to send notification information to the first base station through the first SIM card after controlling the first SIM card to enter the non-connected state from the connected state, and the notification information is configured to notify the first base station of at least one of:

a reason for the first SIM card being controlled to enter the non-connected state from the connected state, or a time for the first SIM card being controlled to enter the non-connected state from the connected state.

In some embodiments, the non-connected state includes at least one of:

an idle state or an inactive state.

Figure 26:
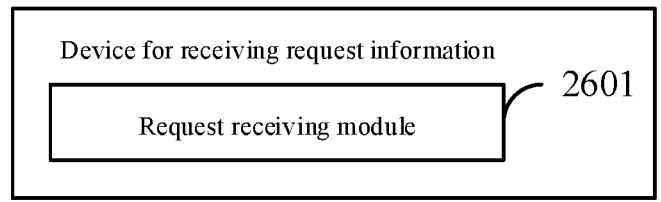
FIG. 26 is a schematic block diagram showing a device for receiving request information according to an embodiment of the present disclosure.

FIG. 26 is a schematic block diagram showing a device for receiving request information according to an embodiment of the present disclosure. The device for receiving request information shown in this embodiment can be applied to a first base station, and the first base station includes but is not limited to a 4G base station, a 5G base station, and a 6G base station. The first base station may communicate with a terminal serving as the user equipment, and the terminal includes but is not limited to a communication device such as a mobile phone, a tablet computer, a wearable device, a sensor, and an Internet of Things device. In an embodiment, the terminal may be a terminal to which the device for sending the request information described in any of the foregoing embodiments is applicable.

In an embodiment, the terminal can be provided with a plurality of SIM cards, which may be conventional SIM cards or eSIM cards, that is, embedded SIM cards. The plurality of SIM cards may belong to the same operator network, or may belong to different operator networks. The following mainly makes an illustrative description in a case where the plurality of SIM cards include at least a first SIM card and a second SIM card.

As shown in FIG. 26, the device for receiving the request information may include:
  a request receiving module 2601, configured to receive request information sent by the terminal through the first SIM card, and the request information is configured to request the first SIM card to enter a non-connected state from a connected state.

Figure 27:
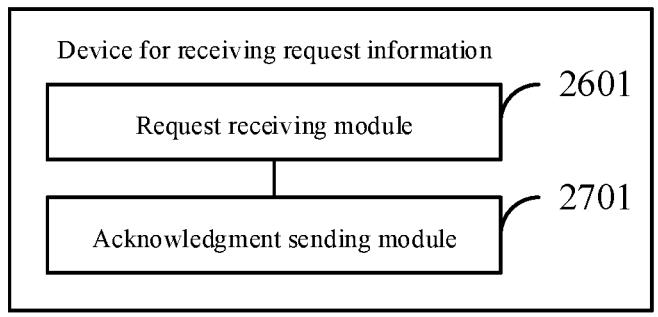
FIG. 27 is a schematic block diagram showing another device for receiving request information according to an embodiment of the present disclosure.

FIG. 27 is a schematic block diagram showing another device for receiving request information according to an embodiment of the present disclosure. As shown in FIG. 27, in some embodiments, the device further includes:
  an acknowledgment sending module 2701, configured to send to the first SIM card acknowledgment information that the request information is received.

Figure 28:
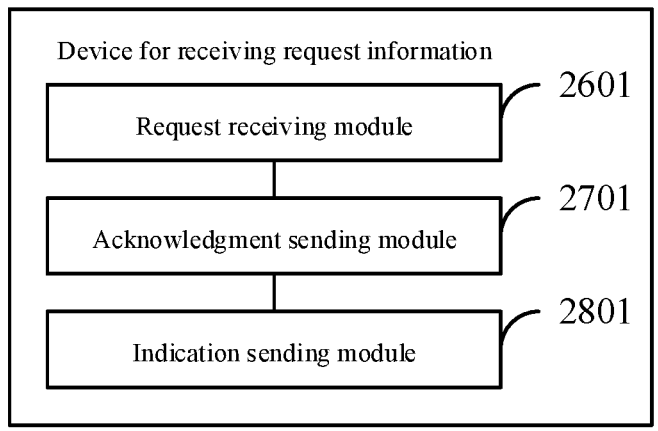
FIG. 28 is a schematic block diagram showing yet another device for receiving request information according to an embodiment of the present disclosure.

FIG. 28 is a schematic block diagram showing yet another device for receiving request information according to an embodiment of the present disclosure. As shown in FIG. 28, in some embodiments, the device further includes:
  an indication sending module 2801, configured to send indication information to the first SIM card, and the indication information is configured to indicate the first SIM card to enter the non-connected state from the connected state.

Figure 29:
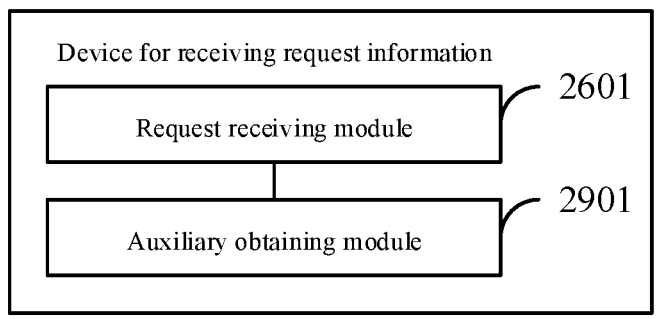
FIG. 29 is a schematic block diagram showing yet another device for receiving request information according to an embodiment of the present disclosure.

FIG. 29 is a schematic block diagram showing yet another device for receiving request information according to an embodiment of the present disclosure. As shown in FIG. 29, in some embodiments, the device further includes:
  an auxiliary obtaining module 2901, configured to obtain auxiliary information from the request information, and determine, according to the auxiliary information, at least one of:
  type information of the first SIM card entering the non-connected state from the connected state;
  configuration information of the first SIM card entering the non-connected state from the connected state; or
  information of a timer of the first SIM card entering the non-connected state from the connected state.

In some embodiments, the timer is started when the request information is sent or when the acknowledgment information for the request information sent by the first base station, which the request information is received by the first base station, is received or when the indication information sent by the first base station indicating the first SIM card to enter the non-connected state is received.

Figure 30:
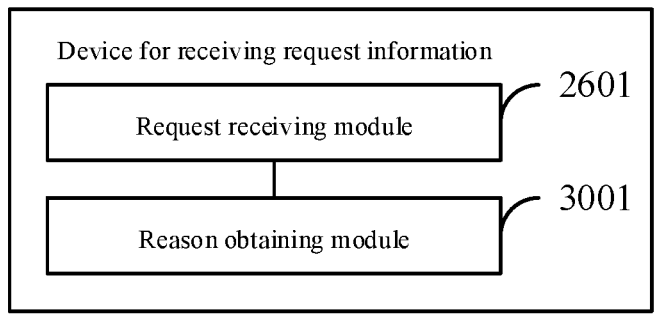
FIG. 30 is a schematic block diagram showing yet another device for receiving request information according to an embodiment of the present disclosure.

FIG. 30 is a schematic block diagram showing yet another device for receiving request information according to an embodiment of the present disclosure. As shown in FIG. 30, in some embodiments, the device further includes:
  a reason obtaining module 3001, configured to obtain reason information from the request information, and determine a reason for the first SIM card requesting to enter the non-connected state from the connected state according to the reason information.

In some embodiments, the reason information includes at least one of:
  a service type that the second SIM card needs to communicate;
  existing an emergency service on the other SIM card; or
  one or more of preset reasons.

Figure 31:
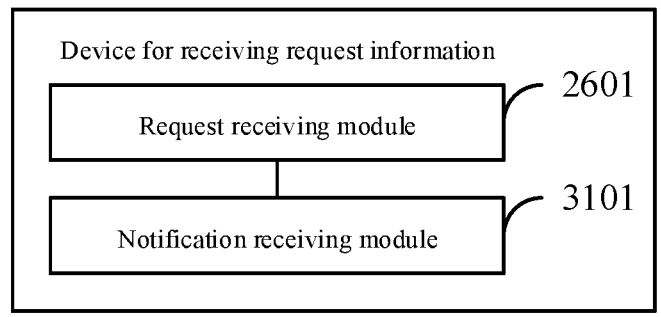
FIG. 31 is a schematic block diagram showing yet another device for receiving request information according to an embodiment of the present disclosure.

FIG. 31 is a schematic block diagram showing yet another device for receiving request information according to an embodiment of the present disclosure. As shown in FIG. 31, in some embodiments, the device further includes:
  a notification receiving module 3101, configured to receive notification information sent by the first SIM card, and the notification information is configured to notify the first base station of at least one of:
  a reason for the first SIM card being controlled to enter the non-connected state from the connected state, or a time for the first SIM card being controlled to enter the non-connected state from the connected state.

With regard to the device in the above embodiments, a specific manner in which each module executes operations has been described in detail in the embodiments of related methods, and will not be described in detail here.

For the device embodiments, since they basically correspond to the method embodiments, the relevant parts can be referred to the description of the method embodiments. The device embodiments described above are only illustrative. The modules described as separated parts may or may not be physically separated, and the parts shown as modules may or may not be physical modules, that is, the modules may be located in one place, or may be distributed over a plurality of network modules. Some or all of the modules may be selected according to actual needs to achieve the objectives of the solutions of the embodiments. Those of ordinary skill in the art can understand and implement the present disclosure without paying creative labor.

Embodiments of the present disclosure also provide a communication device, including:
  a processor; and
  a memory configured to store processor-executable instructions;
  the processor is configured to execute the method for sending the request information described in any of the above embodiments, and/or the method for receiving the request information described in any of the above embodiments.

Embodiments of the present disclosure also provide a computer-readable storage medium having a computer program stored thereon, and the program, when executed by a processor, implements the method for sending the request information described in any of the above embodiments, and/or the method for receiving the request information described in any of the above embodiments.

Figure 32:
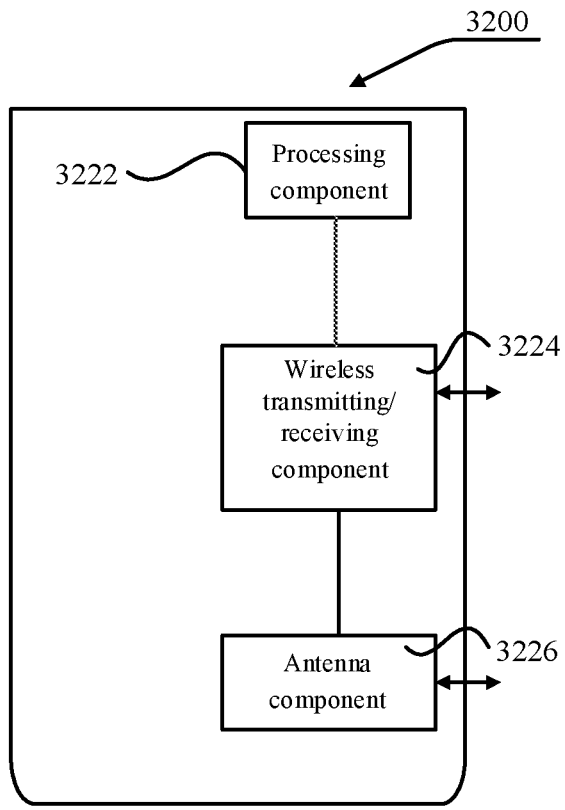
FIG. 32 is a schematic block diagram showing a device for receiving request information according to an embodiment of the present disclosure.

As shown in FIG. 32, which is a schematic block diagram showing a device 3200 for receiving request information according to an embodiment of the present disclosure, the device 3200 may be provided as a base station. Referring to FIG. 32, the device 3200 includes a processing component 3222, a wireless transmitting/receiving component 3224, an antenna component 3226, and a signal processing part specific to a wireless interface. The processing component 3222 may further include one or more processors. One of the processors in the processing component 3222 can be configured to implement the method for receiving the request information described in any of the above embodiments.

Figure 33:
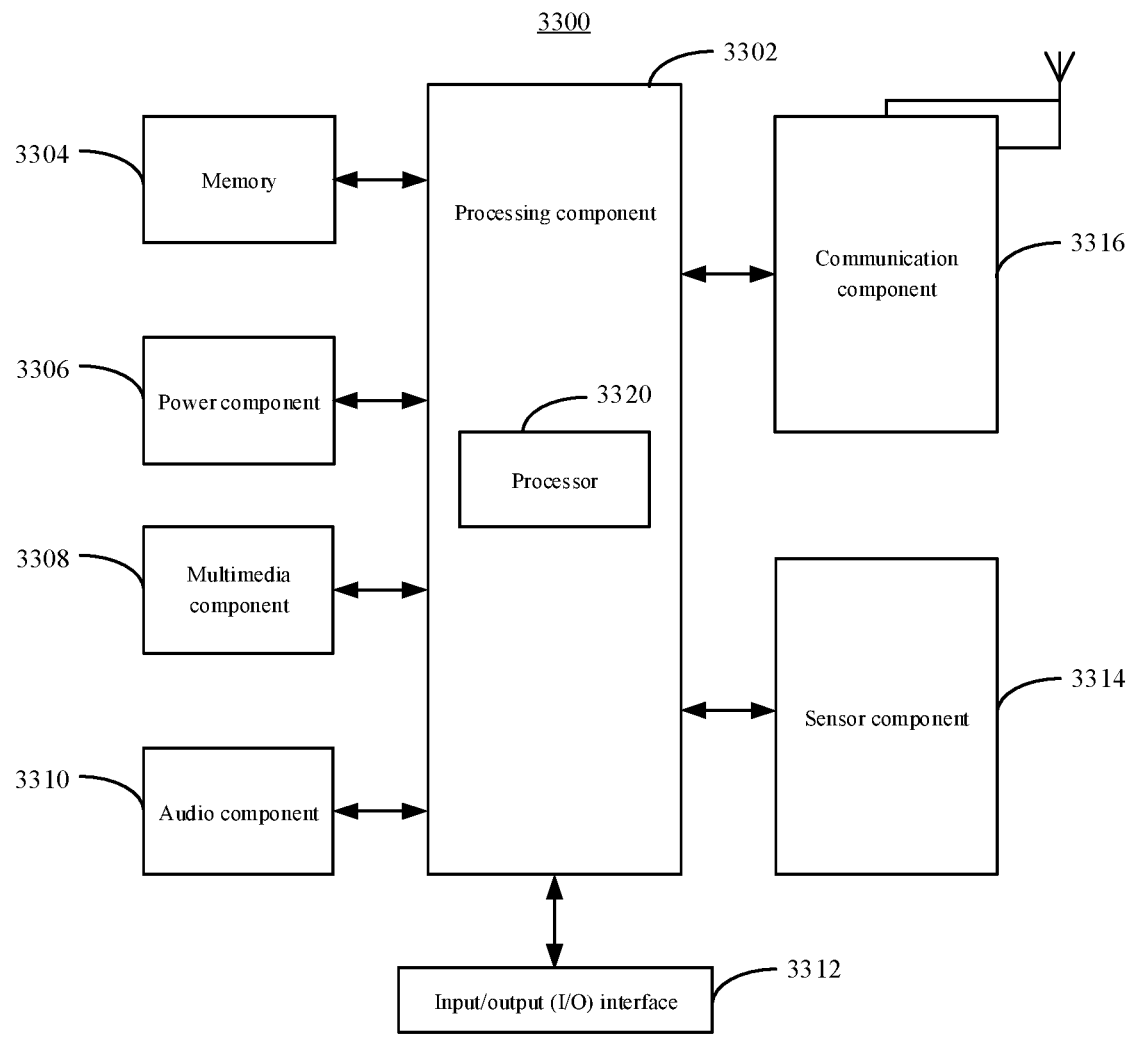
FIG. 33 is a schematic block diagram showing a device for sending request information according to an embodiment of the present disclosure.

FIG. 33 is a schematic block diagram showing a device 3300 for sending requesting information according to an embodiment of the present disclosure. For example, the device 3300 may be a mobile phone, a computer, a digital broadcast terminal, a messaging device, a gaming console, a tablet, a medical device, exercise equipment, a personal digital assistant, and the like.

Referring to FIG. 33, the device 3300 may include one or more of the following components: a processing component 3302, a memory 3304, a power component 3306, a multimedia component 3308, an audio component 3310, an input/output (I/O) interface 3312, a sensor component 3314, and a communication component 3316.

The processing component 3302 typically controls overall operations of the device 3300, such as the operations associated with display, telephone calls, data communications, camera operations, and recording operations. The processing component 3302 may include one or more processors 3320 to execute instructions to perform all or part of the steps in the method for sending the request information as described above. Moreover, the processing component 3302 may include one or more modules which facilitate the interaction between the processing component 3302 and other components. For instance, the processing component 3302 may include a multimedia module to facilitate the interaction between the multimedia component 3308 and the processing component 3302.

The memory 3304 is configured to store various types of data to support the operation of the device 3300. Examples of such data include instructions for any applications or methods operated on the device 3300, contact data, phonebook data, messages, pictures, video, etc. The memory 3304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3306 provides power to various components of the device 3300. The power component 3306 may include a power management system, one or more power sources, and any other components associated with the generation, management, and distribution of power in the device 3300.

The multimedia component 3308 includes a screen providing an output interface between the device 3300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3308 includes a front camera and/or a rear camera. The front camera and the rear camera may receive an external multimedia datum while the device 3300 is in an operation mode, such as a photographing mode or a video mode. Each of the front camera and the rear camera may be a fixed optical lens system or have focus and optical zoom capability.

The audio component 3310 is configured to output and/or input audio signals. For example, the audio component 3310 includes a microphone ("MIC") configured to receive an external audio signal when the device 3300 is in an operation mode, such as a call mode, a recording mode, and a voice recognition mode. The received audio signal may be further stored in the memory 3304 or transmitted via the communication component 3316. In some embodiments, the audio component 3310 further includes a speaker to output audio signals.

The I/O interface 3312 provides an interface between the processing component 3302 and peripheral interface modules, such as a keyboard, a click wheel, buttons, and the like. The buttons may include, but are not limited to, a home button, a volume button, a starting button, and a locking button.

The sensor component 3314 includes one or more sensors to provide status assessments of various aspects of the device 3300. For instance, the sensor component 3314 may detect an open/closed status of the device 3300, relative positioning of components, e.g., the display and the keypad, of the device 3300, a change in position of the device 3300 or a component of the device 3300, a presence or absence of user contact with the device 3300, an orientation or an acceleration/deceleration of the device 3300, and a change in temperature of the device 3300. The sensor component 3314 may include a proximity sensor configured to detect the presence of nearby objects without any physical contact. The sensor component 3314 may also include a light sensor, such as a CMOS or CCD image sensor, for use in imaging applications. In some embodiments, the sensor component 3314 may also include an accelerometer sensor, a gyroscope sensor, a magnetic sensor, a pressure sensor, or a temperature sensor.

The communication component 3316 is configured to facilitate communication, wired or wirelessly, between the device 3300 and other devices. The device 3300 can access a wireless network based on a communication standard, such as WiFi, 2G, 3G, 4G LTE, 5G NR or a combination thereof. In one example embodiment, the communication component 3316 receives a broadcast signal or broadcast associated information from an external broadcast management system via a broadcast channel. In one example embodiment, the communication component 3316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In example embodiments, the device 3300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the method for sending the request information described above.

In embodiments of the present disclosure, there is also provided a non-transitory computer readable storage medium including instructions, such as included in the memory 3304, executable by the processor 3320 in the device 3300, for performing the method for sending the request information described above. For example, the non-transitory computer readable storage medium may be a ROM, a RAM, a CD-ROM, a magnetic tape, a floppy disc, an optical data storage device, and the like.

Embodiments of the present disclosure propose a method for sending request information, a method for receiving request information, a device for sending request information, a device for receiving request information, a communication device, and a computer-readable storage medium.

According to a first aspect of embodiments of the present disclosure, there is provided a method for sending request information, which is performed by a terminal, wherein the terminal is at least provided with a first SIM card and a second SIM card, and the method includes:

sending request information for entering a non-connected state from a connected state to a first base station through the first SIM card in response to the first SIM card being in the connected state with the first base station, and the second SIM card needing to communicate.

In some embodiments of the present disclosure, the method further includes: controlling the first SIM card to enter the non-connected state from the connected state.

In some embodiments of the present disclosure, the method further includes: communicating with a second base station through the second SIM card.

In some embodiments of the present disclosure, the controlling the first SIM card to enter the non-connected state from the connected state includes: controlling the first SIM card to enter the non-connected state from the connected state, in response to receiving acknowledgment information sent by the first base station that the request information is received.

In some embodiments of the present disclosure, the controlling the first SIM card to enter the non-connected state from the connected state in response to receiving the acknowledgment information sent by the first base station that the request information is received includes: determining a service type that the second SIM card needs to communicate, in response to receiving the acknowledgment information sent by the first base station that the request information is received; and controlling the first SIM card to enter the non-connected state from the connected state, in response to the service type being a target service type.

In some embodiments of the present disclosure, the controlling the first SIM card to enter the non-connected state from the connected state in response to receiving the acknowledgment information sent by the first base station that the request information is received includes: receiving indication information sent by the first base station indicating the first SIM card to enter the non-connected state from the connected state, in response to receiving the acknowledgment information sent by the first base station that the request information is received; and controlling the first SIM card to enter the non-connected state from the connected state in response to receiving the indication information.

In some embodiments of the present disclosure, the controlling the first SIM card to enter the non-connected state from the connected state further includes: controlling the first SIM card to enter the non-connected state from the connected state in response to not receiving the indication information within a first duration.

In some embodiments of the present disclosure, the controlling the first SIM card to enter the non-connected state from the connected state includes: repeatedly sending the request information to the first base station, in response to not receiving acknowledgment information sent by the first base station that the request information is received; and controlling the first SIM card to enter the non-connected state from the connected state, in response to receiving the acknowledgment information before a number of times of repeatedly sending the request information reaches a target number of times.

In some embodiments of the present disclosure, the controlling the first SIM card to enter the non-connected state from the connected state further includes: controlling the first SIM card to enter the non-connected state from the connected state, in response to the number of times of repeatedly sending the request information reaching the target number of times and not receiving the acknowledgment information.

In some embodiments of the present disclosure, the controlling the first SIM card to enter the non-connected state from the connected state includes: controlling the first SIM card to enter the non-connected state from the connected state, in response to receiving, within a second duration, the acknowledgment information sent by the first base station that the request information is received.

In some embodiments of the present disclosure, the controlling the first SIM card to enter the non-connected state from the connected state further includes: controlling the first SIM card to enter the non-connected state from the connected state, in response to not receiving, within the second duration, the acknowledgment information sent by the first base station that the request information is received.

In some embodiments of the present disclosure, auxiliary information is carried in the request information, and the auxiliary information includes at least one of: type information of the first SIM card entering the non-connected state from the connected state; configuration information of the first SIM card entering the non-connected state from the connected state; or information of a timer of the first SIM card entering the non-connected state from the connected state.

In some embodiments of the present disclosure, the timer is started when the request information is sent or when the acknowledgment information that the request information is received sent by the first base station is received or when the indication information sent by the first base station indicating the first SIM card to enter the non-connected state is received, and the controlling the first SIM card to enter the non-connected state from the connected state includes: controlling the first SIM card to enter the non-connected state from the connected state in response to expiration of the timer.

In some embodiments of the present disclosure, the auxiliary information includes the information of the timer, and the method further includes: determining the information of the timer according to a service type that the second SIM card needs to communicate.

In some embodiments of the present disclosure, reason information for the first SIM card requesting to enter the non-connected state from the connected state is carried in the request information.

In some embodiments of the present disclosure, the reason information includes at least one of: a paging reason of the second SIM card or service information that the second SIM card needs to communicate; existing an emergency service on the second SIM card; or one or more of preset reasons.

In some embodiments of the present disclosure, the method further includes: sending notification information to the first base station through the first SIM card, after controlling the first SIM card to enter the non-connected state from the connected state, wherein the notification information is configured to notify the first base station of at least one of: a reason for the first SIM card being controlled to enter the non-connected state from the connected state, or a time for the first SIM card being controlled to enter the non-connected state from the connected state.

In some embodiments of the present disclosure, the non-connected state includes at least one of: an idle state or an inactive state.

According to a second aspect of embodiments of the present disclosure, there is provided a method for receiving request information, which is performed by a first base station, and the method includes:

receiving request information sent by a terminal through a first SIM card, wherein the request information is configured to request the first SIM card to enter a non-connected state from a connected state.

In some embodiments of the present disclosure, the method further includes: sending to the first SIM card acknowledgment information that the request information is received.

In some embodiments of the present disclosure, the method further includes: sending indication information to the first SIM card, wherein the indication information is configured to indicate the first SIM card to enter the non-connected state from the connected state.

In some embodiments of the present disclosure, the method further includes: obtaining auxiliary information from the request information, and determining, according to the auxiliary information, at least one of: type information of the first SIM card entering the non-connected state from the connected state; configuration information of the first SIM card entering the non-connected state from the connected state; or information of a timer of the first SIM card entering the non-connected state from the connected state.

In some embodiments of the present disclosure, the timer is started when the request information is sent or when acknowledgment information that the request information is received sent by the first base station is received or when indication information sent by the first base station indicating the first SIM card to enter the non-connected state is received.

In some embodiments of the present disclosure, the method further includes: obtaining reason information from the request information, and determining a reason for the first SIM card requesting to enter the non-connected state from the connected state according to the reason information.

In some embodiments of the present disclosure, the reason information includes at least one of: a service type that a second SIM card needs to communicate; existing an emergency service on the other SIM card; or one or more of preset reasons.

In some embodiments of the present disclosure, the method further includes: receiving notification information sent by the first SIM card, wherein the notification information is configured to notify the first base station of at least one of: a reason for the first SIM card being controlled to enter the non-connected state from the connected state, or a time for the first SIM card being controlled to enter the non-connected state from the connected state.

According to a third aspect of embodiments of the present disclosure, there is provided a device for sending request information, which is applied to a terminal, wherein the terminal is at least provided with a first SIM card and a second SIM card, and the device includes:

a request sending module, configured to send request information for entering a non-connected state from a connected state to a first base station through the first SIM card in response to the first SIM card being in the connected state with the first base station, and the second SIM card needing to communicate.

According to a fourth aspect of embodiments of the present disclosure, there is provided a device for receiving request information, which is applied to a first base station, and the device includes:

a request receiving module, configured to receive request information sent by a terminal through a first SIM card, wherein the request information is configured to request the first SIM card to enter a non-connected state from a connected state.

According to a fifth aspect of embodiments of the present disclosure, there is provided a communication device, including:

a processor; and
a memory configured to store processor-executable instructions;
wherein the processor is configured to execute the method for sending the request information as described above, and/or the method for receiving the request information as described above.

According to a sixth aspect of embodiments of the present disclosure, there is provided a computer-readable storage medium having a computer program stored thereon, wherein the program, when executed by a processor, implements steps in the method for sending the request information as described above, and/or the method for receiving the request information as described above.

According to embodiments of the present disclosure, in a case where the first SIM card is in the connected state with the first base station, when the second SIM card needs to communicate, the request information can be sent to the first base station through the first SIM card to request to enter the non-connected state from the connected state. Accordingly, the first base station can determine that the first SIM card needs to enter the non-connected state from the connected state according to the request information, so that the first base station does not mistakenly consider that due to external reasons such as shadow fading, the first SIM card exits the connected state, and thus does not perform misoperations such as improving the signal power in order to communicate with the first SIM card.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

It should be noted that, relational terms such as "first" and "second" in the disclosure are used only to distinguish an entity or operation from another entity or operation, and do not necessarily require or imply any actual relationship or sequence existed between these entities or operations. The terms "comprises", "includes" or any other variation thereof are intended to encompass non-exclusive inclusion such that a process, a method, an article or a device comprising a list of elements includes not only those elements, but also other elements not explicitly listed, or also includes elements inherent to such process, method, article or device. Without more limitations, an element defined by the sentence "including a . . . " does not preclude a presence of additional identical elements in the process, method, article or device that includes the element.

The methods and devices provided by the embodiments of the present disclosure have been described in detail above, and specific examples are used herein to set forth the principles and implementations of the present disclosure. The description of the above embodiments is only used to assist in understanding the methods of the present disclosure and their core concept. In addition, for those skilled in the art, according to the concept of the present disclosure, there may be changes in the specific implementation and application scope. In summary, the content of the specification should not be construed as limiting the present disclosure.

What is claimed is:

1. A method for sending request information, performed by a terminal, wherein the terminal is at least provided with a first Subscriber Identity Module (SIM) card and a second SIM card, and the method comprises:
   determining that the first SIM card is in a connected state with a first base station and the second SIM card needs to communicate; and
   sending, to the first base station through the first SIM card, request information for entering a non-connected state from the connected state,
   wherein the method further comprises:
   controlling the first SIM card to enter the non-connected state from the connected state,
   wherein the controlling the first SIM card to enter the non-connected state from the connected state comprises:
   receiving acknowledgment information for the request information sent by the first base station;
   receiving indication information sent by the first base station indicating the first SIM card to enter the non-connected state from the connected state, or determining that the indication information is not received within a first duration; and
   controlling the first SIM card to enter the non-connected state from the connected state.

2. The method according to claim 1, further comprising: communicating with a second base station through the second SIM card.

3. The method according to claim 1, wherein the controlling the first SIM card to enter the non-connected state from the connected state comprises further comprising:
   receiving, within a second duration, the acknowledgment information for the request information sent by the first base station, or not receiving, within the second duration, the acknowledgment information for the request information sent by the first base station; and
   controlling the first SIM card to enter the non-connected state from the connected state.

4. The method according to claim 1, wherein auxiliary information is carried in the request information, and the auxiliary information comprises at least one of:
   type information of the first SIM card entering the non-connected state from the connected state;
   configuration information of the first SIM card entering the non-connected state from the connected state; or
   information of a timer of the first SIM card entering the non-connected state from the connected state, wherein the timer is started when the request information is sent, or when the acknowledgment information for the request information sent by the first base station is received, or when the indication information sent by the first base station indicating the first SIM card to enter the non-connected state is received.

5. The method according to claim 1, wherein reason information for the first SIM card requesting to enter the non-connected state from the connected state is carried in the request information; and
   wherein the reason information comprises at least one of following:
   a paging reason of the second SIM card or service information that the second SIM card needs to communicate;
   existing an emergency service on the second SIM card; or
   one or more of preset reasons.

6. The method according to claim 1, further comprising:
   controlling the first SIM card to enter the non-connected state from the connected state; and
   sending notification information to the first base station through the first SIM card, wherein the notification information is configured to notify the first base station of at least one of:
   a reason for the first SIM card being controlled to enter the non-connected state from the connected state, or a time for the first SIM card being controlled to enter the non-connected state from the connected state.

7. A method for receiving request information, performed by a first base station, and comprising:
   receiving request information sent by a terminal through a first Subscriber Identity Module (SIM) card, wherein the request information is configured to request the first SIM card to enter a non-connected state from a connected state, wherein the method further comprises:
   sending, to the first SIM card, acknowledgment information for the received request information; and
   sending indication information to the first SIM card, wherein the indication information is configured to indicate the first SIM card to enter the non-connected state from the connected state, wherein the first SIM card is controlled by the terminal to enter the non-connected state from the connected state in response to the indication information sent by the first base station to the first SIM card being received by the first SIM, or in response to the indication information sent by the first base station to the first SIM card being not received by the first SIM within a first duration.

8. The method according to claim 7, further comprising: obtaining auxiliary information from the request information, and determining, according to the auxiliary information, at least one of:
   type information of the first SIM card entering the non-connected state from the connected state;
   configuration information of the first SIM card entering the non-connected state from the connected state; or
   information of a timer of the first SIM card entering the non-connected state from the connected state; and
   wherein the timer is started when the request information is sent or when the acknowledgment information for the received request information sent by the first base station is received or when the indication information sent by the first base station indicating the first SIM card to enter the non-connected state is received.

9. The method according to claim 7, further comprising: obtaining reason information from the request information, and determining a reason for the first SIM card requesting to enter the non-connected state from the connected state according to the reason information, wherein the reason information comprises at least one of:

a service type that a second SIM card needs to communicate;

existing an emergency service on another SIM card; or one or more of preset reasons.

10. The method according to claim 7, further comprising:

receiving notification information sent by the first SIM card, wherein the notification information is configured to notify the first base station of at least one of:

a reason for the first SIM card being controlled to enter the non-connected state from the connected state, or a time for the first SIM card being controlled to enter the non-connected state from the connected state.

11. A device, comprising:

a processor; and a memory configured to store processor-executable instructions;

wherein the device is at least provided with a first SIM card and a second SIM card, and the processor is configured to perform the method according to claim 1:

determine that the first SIM card is in a connected state with a first base station and the second SIM card needs to communicate; and send, to the first base station through the first SIM card, request information for entering a non-connected state from the connected state.

12. A method for sending request information, performed by a terminal, wherein the terminal is at least provided with a first Subscriber Identity Module (SIM) card and a second SIM card, and the method comprises:

determining that the first SIM card is in a connected state with a first base station and the second SIM card needs to communicate; and sending, to the first base station through the first SIM card, request information for entering a non-connected state from the connected state, wherein the method further comprises:

controlling the first SIM card to enter the non-connected state from the connected state, wherein the controlling the first SIM card to enter the non-connected state from the connected state comprises:

determining that acknowledgment information for the request information sent by the first base station is not received;

repeatedly sending the request information to the first base station;

determining that the acknowledgment information is received before a number of times of repeatedly sending the request information reaches a target number of times, or determining that the number of times of repeatedly sending the request information reaches the target number of times and the acknowledgment information is not received; and controlling the first SIM card to enter the non-connected state from the connected state.

13. The method according to claim 12, further comprising:

communicating with a second base station through the second SIM card.

14. The method according to claim 12, further comprising:

not receiving, within a second duration, the acknowledgment information for the request information sent by the first base station.

15. The method according to claim 12, wherein auxiliary information is carried in the request information, and the auxiliary information comprises at least one of:

type information of the first SIM card entering the non-connected state from the connected state;

configuration information of the first SIM card entering the non-connected state from the connected state; or information of a timer of the first SIM card entering the non-connected state from the connected state.

16. The method according to claim 15, wherein the timer is started when the request information is sent, or when the acknowledgment information for the request information sent by the first base station is received, or when the indication information sent by the first base station indicating the first SIM card to enter the non-connected state is received.

17. The method according to claim 12, wherein reason information for the first SIM card requesting to enter the non-connected state from the connected state is carried in the request information; and wherein the reason information comprises at least one of following:

a paging reason of the second SIM card or service information that the second SIM card needs to communicate;

existing an emergency service on the second SIM card; or one or more of preset reasons.

18. The method according to claim 12, further comprising:

sending notification information to the first base station through the first SIM card, wherein the notification information is configured to notify the first base station of at least one of:

a reason for the first SIM card being controlled to enter the non-connected state from the connected state, or a time for the first SIM card being controlled to enter the non-connected state from the connected state.

19. A device, comprising:

a processor; and a memory configured to store processor-executable instructions;

wherein the processor is configured to perform the method according to claim 7.

20. A device, comprising:

a processor; and a memory configured to store processor-executable instructions;

wherein the device is at least provided with a first SIM card and a second SIM card, and the processor is configured to perform the method according to claim 12.

* * * * *